No. 888,761. PATENTED MAY 26, 1908.
H. F. SNYDER & J. T. HUME.
SPEED GOVERNOR.
APPLICATION FILED JAN. 8, 1904.
5 SHEETS—SHEET 5.
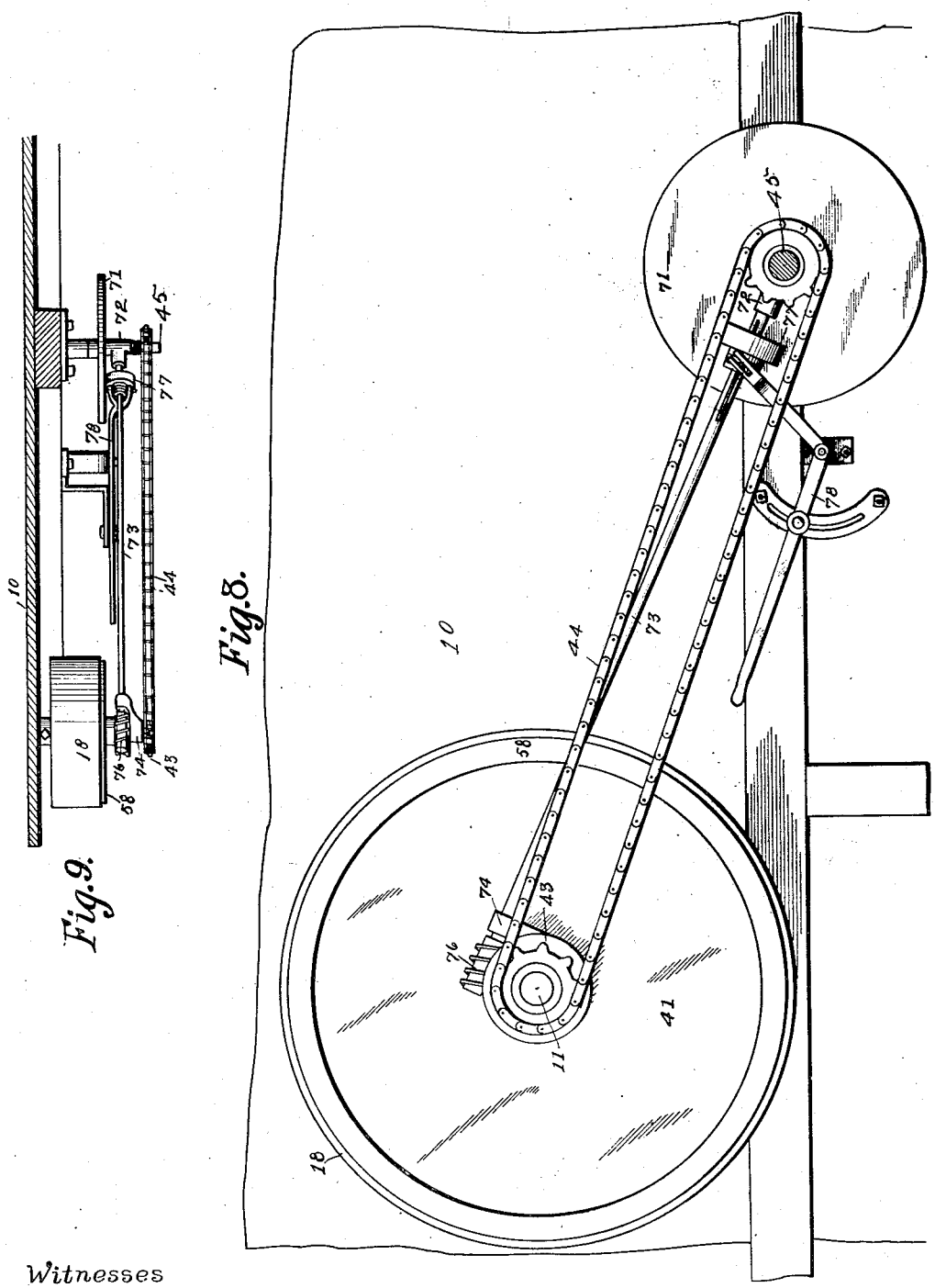
Witnesses
A. G. Hague.
S. F. Christy.
Inventors Howard F. Snyder and
John T. Hume
By Orwig & Lane attys

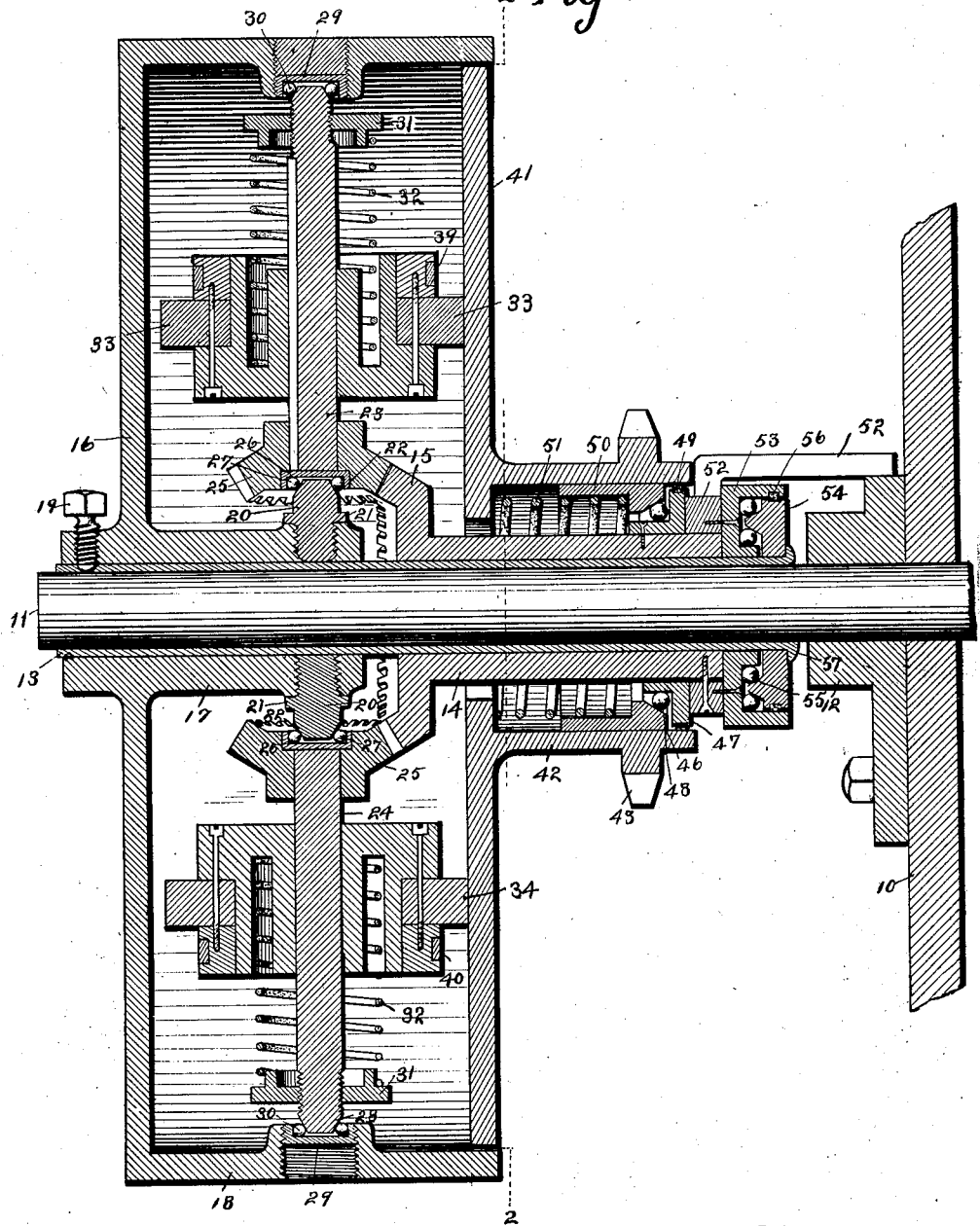

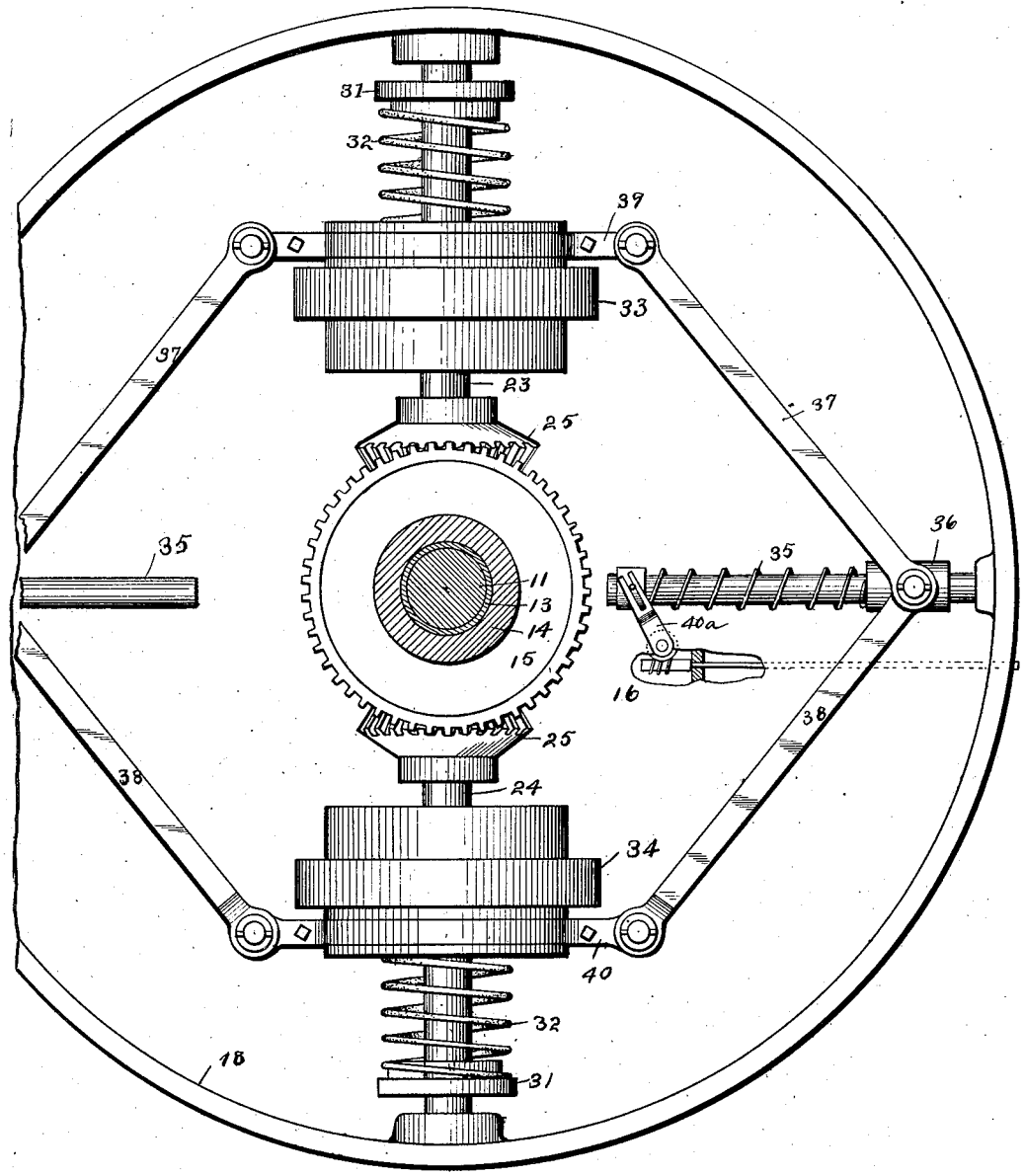

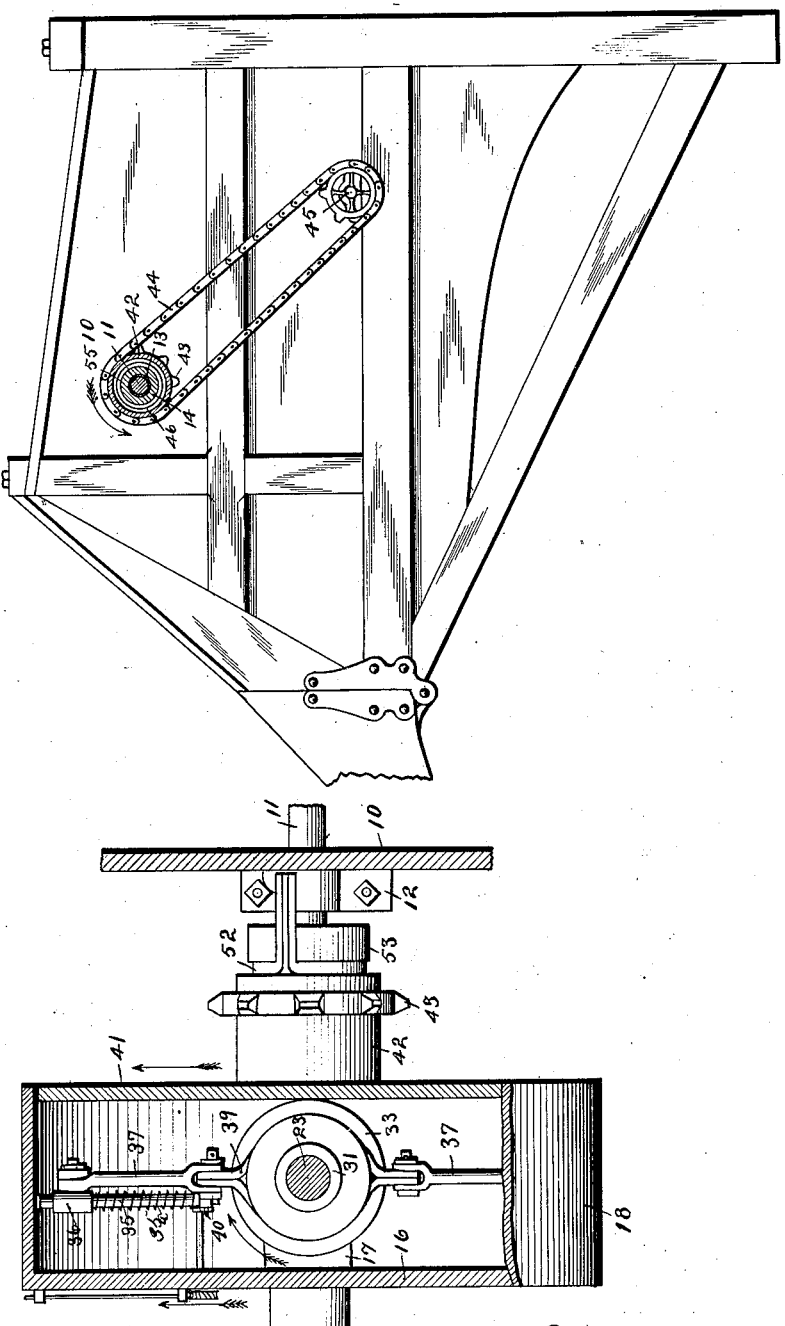

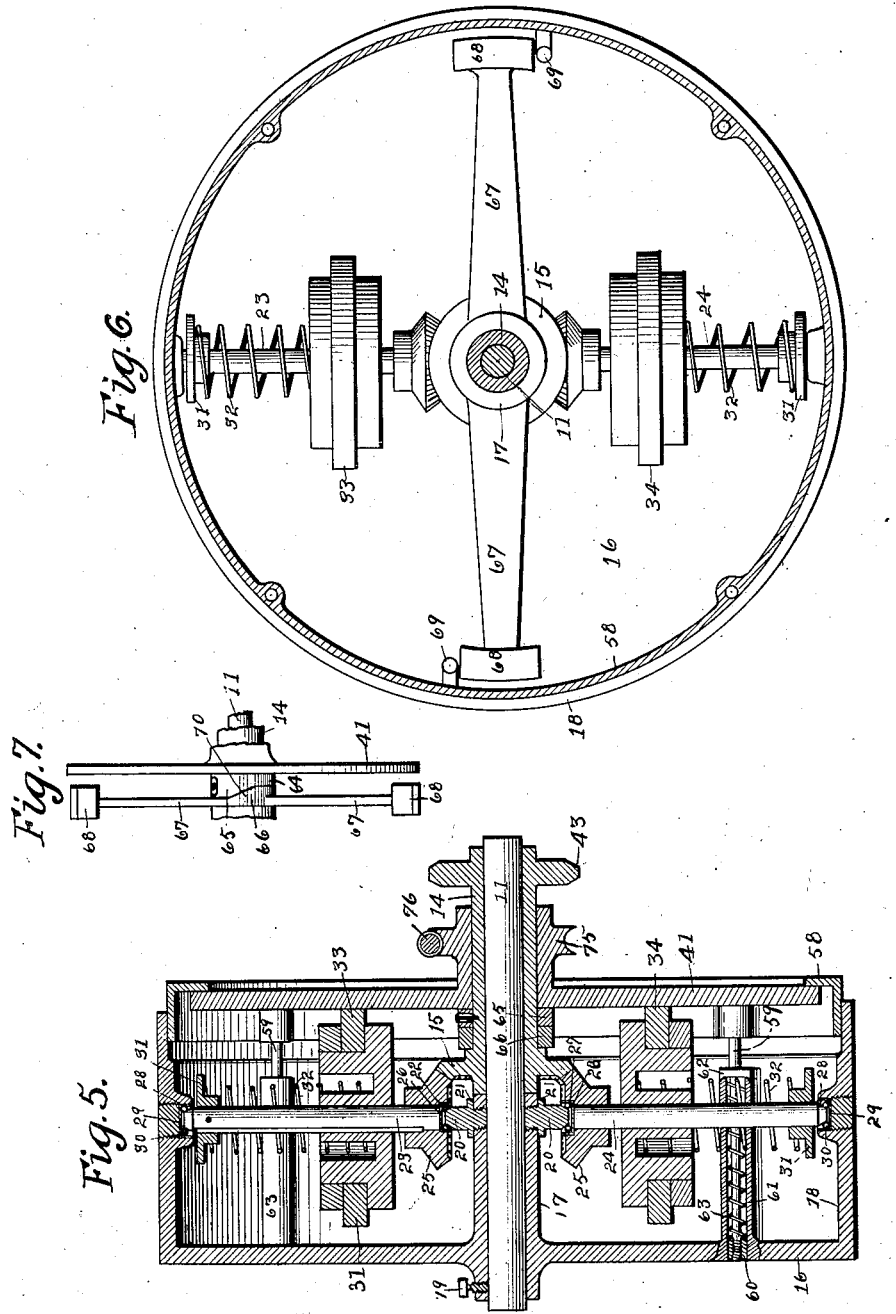

UNITED STATES PATENT OFFICE.

HOWARD F. SNYDER AND JOHN T. HUME, OF NEWTON, IOWA, ASSIGNORS TO FRED L. MAYTAG, OF NEWTON, IOWA.

SPEED-GOVERNOR.

No. 888,761.  Specification of Letters Patent.  Patented May 26, 1908.

Application filed January 8, 1904. Serial No. 188,263.

*To all whom it may concern:*

Be it known that we, HOWARD F. SNYDER and JOHN T. HUME, citizens of the United States, residing at Newton, in the county of Jasper and State of Iowa, have invented certain new and useful Improvements in Speed-Governors, of which the following is a specification.

The objects of our invention are to provide a speed governor, compact in size, for use in connection with band cutters and feeders for threshing machines and other devices where it is desirable to control the speed automatically, and a further object is to provide a speed governor having friction wheels therein, which are controlled by centrifugal force as these wheels are driven around an axis, adjacent to which they are mounted. And further, to so mount the friction wheels that they will rotate about their axis and describe a circular path on a friction disk which is mounted adjacent to and normally in engagement with said friction wheels, said wheels and disk being designed to coöperate with the other parts of our device and with each other in regulating the speed of the machine upon which our governor is mounted.

A further object is to provide means for regulating the pressure on the outside of the friction wheels so that these wheels can be more or less easily moved radially outward, by centrifugal force, to describe a larger circular path on the friction disk mounted adjacent to and in engagement with them.

Our invention consists in certain details in the construction, arrangement and combination of the various parts of the device, whereby the objects contemplated are attained, as hereinafter more fully set forth, pointed out in our claims and illustrated in the accompanying drawings, in which:—

Figure 1 is a vertical sectional view of the speed governor showing its position when mounted on the driving shaft of the device to which it is attached. Fig. 2 is a sectional view of the interior of the flanged disk looking at said disk from the left side of the line 2—2 of Fig. 1. Fig. 3 is a plan view of the speed governor with a portion of the flanged disk removed and the shaft upon which one of the friction wheels is mounted, cut away. This view is designed to show the way in which the eveners for maintaining the friction wheels in the same radial position away from their common axis, are mounted. Fig. 4 is a side elevation of a portion of the band cutter and feeder to which our device is connected showing the relative positions of the shafts which are controlled by our speed governor. Fig. 5 is a modified form of the device cut through in the same way as in Fig. 1 and showing a vertical sectional view of the device. Fig. 6 is a sectional view of the interior of the flanged disk looking at said disk from the left side of the line 2—2 of Fig. 1, this view, however, shows a slight modification of the device. Fig. 7 is an end view of the friction disk and the device for automatically moving the disk slightly away from or adjacent to the friction wheels. Fig. 8 is a side elevation of the modified form of our device attached in position for use on a band cutter and feeder. Fig. 9 is a top or plan view of the disk shown in Fig. 8.

Referring to the accompanying drawing, we have used the reference numeral 10 to indicate the frame of the device to which our speed governor is attached.

The reference numeral 11 indicates the main driving shaft of the device.

Attached to the outside of frame 10 is a boxing 12 which is firmly connected with the frame 10. Mounted around the shaft 11 and outside the boxing 12 is a sleeve 13, which is designed to hold certain parts of the device in position relative to each other as pointed out below. Rotatably mounted outside of the sleeve 13 is a hub 14 having the bevel gear wheel 15 mounted on its end away from the frame 10; said bevel gear wheel being made integral with the boxing 14.

Mounted outside of the bevel gear wheel 15 and around the sleeve 13 is a disk 16 having the hub 17 extending from its central portion and around the sleeve 13. Extending inwardly from the outer periphery of the body of the disk is a circular flange 18 formed integral with the disk 16, said flanged disk being designed to incase a large portion of the operative parts of our speed governor.

The flanged disk 16 and also the sleeve 13 are held firmly in position relative to the main driving shaft 11, by means of a set screw 19. Mounted in the hub 17 and on the opposite sides of the driving shaft 11 are the cone bearings 20 and 21, having a beveled edge 22 at their outer portions. Mounted outside of the cone bearings 20 and 21 are the friction wheel bearing shafts 23 and 24, each having a bevel gear wheel 25 at its inner end; said bevel gear wheels 25 having their central portion cut away to admit the bearings 20 and 21 respectively, and the beveled portions of said wheels constantly in mesh with the bevel gear wheel 15. Attached to the inner end of each of the shafts 23 and 24 is a cup bearing 26 designed to receive the cone bearings 20 and 21. Interposed between the beveled edges 22 of the bearings 20 and 21 and the cup bearings 26, are the balls 27, which form a ball bearing between the parts 22 and 26. The outer end of each of the shafts 23 and 24 is beveled at 28 to form a cone bearing. Mounted inside the flange 18 and on opposite sides of the main driving shaft 11 is a cup bearing 29, designed to receive the cone bearings at the outer ends of the shafts 23 and 24. Interposed between the beveled portions at the outer ends of these shafts and the bearings 29, are the balls 30 forming a bearing to allow a free rotation of these shafts.

Mounted near the outer end of each of the shafts 23 and 24 is a stop 31, designed to maintain the springs 32, which are mounted inside of said stops and around each of the shafts 23 and 24, in position and prevent them from outward movement on the shafts 23 and 24 when the flanged disk 16 is rotated until the disk has acquired enough speed so that centrifugal force will cause the friction wheels to slide radially outward on the shafts 23 and 24 and compress these springs 32 by screwing and unscrewing the stops 31, the tension of the springs 32 can be easily adjusted, the method of the adjustment being clearly shown in Fig. 1 of the drawings.

Slidingly mounted on the shafts 23 and 24 respectively are the friction wheels 33 and 34; each of said friction wheels being splined to shaft upon which it is mounted to prevent rotation except when the shafts 23 and 24 are rotated. The inner end of each of the springs 32 engages the friction wheel nearest it and maintains said wheel at its inner limit of movement on the shafts 23 and 24. It will be clearly seen that as the speed of the shaft 11 increases, the friction wheels will be thrown radially outward by centrifugal force.

Attached to the inside of the flange 18 and at diametrically opposite points and midway between the bearings 28 on the flanged disk 16 are the rods 35 extending radially inward from their points of attachment. The sleeves 36 are slidingly mounted on the rods 35 and capable of movement toward or away from each other. Pivotally attached at one end to each of the sleeves 36 are the arms 37 and 38 each of which are attached at their outer ends to the collars 39 and 40. The collars 39 and 40 are connected with the friction wheels 33 and 34 respectively, in such a way that the rotary movement of the friction wheels is not interfered with; thus an equalizer is provided to maintain the friction wheels at points equi-distant from the driving shaft 11 while they are being rotated. The necessity of providing an equalizer is obvious owing to the fact that the tension of the springs 32 might be unequal, when, if an equalizer were not provided, one of the friction wheels would be farther from the driving shaft 11 than the other. We have also provided a tension adjuster $40^a$ whereby the tension of the spring $35^a$ may be increased or diminished from the exterior of the flanged disk by a key operated shaft so as to control the radial movement of the friction wheels 33 and 34 and thus arrange the parts so that it will take more or less centrifugal force to operate them depending upon the compression of the spring $35^a$.

Rotatably mounted on the hub 14 in such a way that its inner face is in engagement with the friction wheels 33 and 34 is a friction disk 41 having a hub 42 integral with it, said hub extending away from the bevel gear wheel 15 and having a sprocket wheel 43 mounted thereon. This sprocket wheel 43 is designed to allow the chain 44 to be passed over it and over a sprocket wheel on the driven shaft 45 to operate said driven shaft and drive the conveyers connected with said draft.

Mounted on the interior of the hub 42 and adjacent to the sprocket wheel 43 is a cup 47 for the cone bearing 46 said cup being attached to the hub 14. It will be seen that by the use of this construction a slight tilting of the friction disk will be allowed and the friction disk and both of the friction wheels will be kept constantly in engagement with each other throughout the entire revolution of these parts, that is to say, if one of the friction wheels wears more rapidly than the other the friction disk near it, being driven by these friction wheels will wabble slightly and yet the driving power of either of the friction wheels will not be diminished.

Mounted between the outer portion of the cup bearing and the portion of the hub 42 adjacent to it is a dust ring 49, designed to prevent dirt or other foreign substances from clogging the bearings. Mounted between the flange 50 which is on the interior of the cone bearing and the outer face of the friction disk, and around the boxing 14, is the spring 51 designed to normally hold the friction disk 41 in engagement with the friction wheels 33 and 34. As the friction wheels are rotated, the friction disk will be constantly in engagement with these wheels on account of the action of the spring 51 and as this friction disk is rotated, the hub will act on the ball bearings and thus allow free rotation of the friction disk and its hub. The action of the spring will also allow a slight wabbling of the friction disk, if one of the friction wheels should wear more rapidly than the other.

The boxing 14 referred to above, is held firmly in position relative to the frame 10 of the device to which the governor is attached, by means of the arm 52, so that this boxing 14 will not rotate when the main shaft 11 is rotated.

Firmly attached to the end of the boxing 14 away from the gear wheel 15 is the cup 53. Entering this cup 53 is the cone bearing 54 and in the cup 53 are the balls 55 designed to form with the cup and cone a ball bearing. Mounted between the outside flange of the cup and the cone 54 is the dust ring 56 designed to prevent dirt and other foreign substances from getting into and clogging the bearings. The cone bearing 54 is maintained in position relative to the balls 55 by means of the flange 57 on the sleeve 13 which engages the outside portion of said bearing. Thus as the cup 53 and the boxing to which the cup is attached are firmly held in position relative to the frame of the device to which the speed governor is attached, and as the sleeve 13 is maintained firmly in position relative to the shaft 11, it will be seen that as the shaft 11 is rotated, the cone bearing will be rotated in the cup 53.

When the friction wheels are at their inner limit of movement and adjacent to the shaft 11, the distance through which the periphery of each of these friction wheels travels on the friction disk 41 is equal to the circumference of the said friction wheel multiplied by the number of revolutions of said wheel while the shaft 11 makes a single revolution. As the friction wheels move radially outward, it will be readily seen that the distance to be traveled by these wheels on the friction disk increases, thus causing the friction disk to be rotated in the same direction as the friction wheels are driven around the shaft 11 at a velocity depending on the radial position of the friction wheels.

When the friction wheels are at their inner limit of movement and are being driven so that their peripheries travel in a circular path on the inner face of the friction disk, and as these friction wheels are being rotated at the same time that they are driven in a circular path around the axle 11 on account of the construction of the gearings which drives them, the friction disk will remain stationary, but as soon as the friction wheels are moved radially outward by centrifugal force caused by the rotation of the shaft 11, the length of the circular path which they describe on the friction disk will be increased and the length of this path will be greater than the distance traveled by the peripheries of the friction wheels during a single revolution of the shaft 11, thus causing the friction wheels to drive the friction disk and the devices which are connected with it.

As the speed of the main driving shaft increases, the friction wheels will be moved radially outward a greater distance from the shaft 11 and the friction disk will correspondingly be driven more rapidly. For, as the friction wheels move farther away from each other they describe a greater circle on the face of the friction disk, thus causing a higher speed to be imparted to this disk. The converse of this statement is also true and it will be clearly seen that when the main driving shaft drives harder than is customary, the speed of the shaft will be diminished and in consequence of this fact, the friction wheels will move inwardly toward each other and the friction disk will accordingly be driven slower and if the shaft moves too slowly the friction disk will stop rotating entirely as the friction wheels describe exactly the right circumference on said disk. Thus by the use of our governor, the speed of the friction disk and its connections is controlled by the speed of the driving shaft.

In practical use, our speed governor is mounted on the shaft 11 by simply inserting in the sleeve 13 the main driving shaft 11 of the device to which it is attached, and adjust the set screw 19 to maintain the sleeve in position on the shaft. The arm 52 is then fixed to the boxing 14 to maintain said boxing in position relative to the frame 10 of the device. The sprocket chain 44 is then placed around the sprocket wheel 43, and the sprocket wheel 45 which is mounted on the shaft to be driven, and which drives the conveyers or other mechanism forming a part of the devices to which this speed governor is attached. As the boxing 14 is held in stationary position by the arm 52, the bevel gear wheel 15 will also be held stationary while the shaft 11 is being rotated. On account of the flanged disk 16 being firmly attached to the shaft 11, this flanged disk will be rotated as the shaft 11 is rotated and as the friction wheels and their mountings are connected with this disk they will be moved around with the shaft 11 and the flanged disk 16 in a circular path. As the friction wheels are moved around in a circular path, these friction wheels will also be rotated on account of the shafts upon which they are mounted, having the gear wheels 25 on their inner ends in mesh with the stationary gear wheel 15. Thus, as these friction wheels are rotated, their peripheries will engage the inner surfaces of the friction disk 41, and each of these friction wheels will constantly be kept in engagement with the friction disk on account of the way the friction disk is mounted, thus causing a variable rotation of the friction disk when the friction wheels are moved away from their inner limits of movement.

Assuming that the driving shaft of the device is rotated at a high rate of speed, the driven shaft will be rotated at a much less rate of speed. If the speed of the driving shaft is diminished, the speed of the driven shaft, through my governor, is decreased much more rapidly, and hence this ratio.

In the modified form of the device as shown in Figs. 5, 6, 7, 8 and 9, we have provided a flanged rim 58, the flange of which extends a slight distance over the outside face of the friction disk 41. On the inside of said flanged rim we have attached the screw threaded rod 59 which is designed to extend across the interior of the flange wheel 16. Extending around the rod 59 is a spring 61 which has one of its ends resting against the cap 62 which forms a portion of the casing 63 which is outside of the portion of the rod upon which the spring 61 is mounted. The other end of said spring rests against the nut 60 so that as the spring expands, the rod and the flange member 58, to which it is attached, are drawn towards the body portion of the flanged wheel 16 and thus the friction disk 41 will be maintained in position against the friction wheels 33 and 34 when the disk is in position for use. There are a number of these rods 59 connecting the flange rim with the body portion of the flange wheels 16 so as to hold this flange rim in position relative to the friction disk and thus maintain the friction disk in position against all of the friction wheels as the parts are operated. This spring 61 takes the place of the spring 51 in the form of the device shown in Figs. 1, 2, 3, and 4 and accomplishes the same results as does this spring 51.

In the modified form of the device instead of holding the modified hub 14$^a$ stationary as is done in the device shown in Figs. 1, 2, 3 and 4 of the drawings by means of the arm 52, the friction disk 41 is designed to be held very nearly stationary by means of the worm gear attachment, hereinafter to be more fully described or so that the friction disk instead of being driven by the friction wheels as in the above described form of our device, the friction disk can be driven from the driven shaft 45 and the driven shaft then will be operated by the friction wheels rotating on the friction disk and thus causing the shafts upon which these friction wheels are mounted to rotate the hub or axle 14$^a$ because the gear wheels on the shafts 23 and 24 are in mesh with the gear wheels 15 which is connected with the hub.

It is obvious that the sprocket wheel 43$^a$ in this modified form must be attached to the hub 14$^a$ so that as the hub is rotated the sprocket wheel 43$^a$ will be rotated and the chain 44, which is mounted on the driven shaft 45, so that in the modified form of the device the friction between the friction disk and the friction wheels, when the friction wheels are in certain radial positions will cause the hub 14$^a$ to be rotated on the main driving shaft. When the friction wheels are in the position, shown in Fig. 5, the beveled gear wheels 25 will be simply moved around the beveled gear wheel 15 without driving it, but as soon as the friction wheels are moved radially by centrifugal force caused by the rapid rotation of the shaft 11, the friction wheels having to pass over the greater circular path on the friction disk 41 will be rotated a great number of times in a single rotation of the shaft 11 than when at the normal position shown in Fig. 5 and thus the bevel gear wheels 25 will be rotated a great number of times and will cause the bevel gear wheel which is attached to the hub 14$^a$ to be rotated.

When the shaft 11 is being rotated at a sufficient speed, the friction wheels will be maintained by centrifugal force some distance outside of the position shown in Fig. 5 and cause the spring 32 to be compressed and the hub 14$^a$ to be rotated at a sufficient speed to drive the driven shaft 45 and thus operate the conveyers which are connected with and designed to be driven by the shaft 45. Mounted around the hub 14$^a$ and immediately inside of the friction disk 41 is a slidingly mounted sleeve 64 so arranged that it can be moved against the inner face of the friction disk 41 or can be moved from said disk. This sleeve 64 has an inwardly projecting shoulder 65 which is designed to be engaged by a corresponding shoulder to be described. Rotatably mounted on the hub 14$^a$ and immediately inside of the sleeve 64 is a sleeve 66 having the arms 67 extending radially outward, in opposite direction, therefrom. Mounted on the outer end of arm 67 is a weight 68 which is designed to maintain the arms and the sleeve to which they are attached in a certain position when the flanged disk and its attachments are rotated at a certain rate of speed. On the inner surface of the flange of the flanged disk 16 are the lugs 69 which are designed to engage the weights 68 when the flanged disk 16 is being rotated rapidly and these lugs are designed to prevent the further rotation of the sleeve 66 and its attachments. When the speed of the driving shaft 11 and the flanged wheel which is attached to it is diminished suddenly, the weights 68 will swing away from the lugs 69 and cause the shoulder 70 which is on the sleeve 66 to be forced into engagement with the shoulder 65 on the sleeve 64 and thus force the sleeve 64 into engagement with the inner face of the friction disk 41 and cause said friction disk to be moved away from the friction wheels 33 and 34, thus allowing these friction wheels to move radially inwardly without the obstruction of their engagement with the friction disk. The particular shape of the shoulder 65 and 70 is essential to accomplish this result, as they must be sloping in order to accomplish the result desired.

In practical operation some slight difficulty had been experienced in the operating of the device, owing to the fact that the friction wheels did not respond quickly enough when the speed of the driving shaft 11 diminished owing to said friction wheels being maintained so strongly in engagement with the friction disk, but by the use of this attachment this difficulty has been obviated and the friction wheels are allowed by means of it to respond very readily to any decrease in the speed of the driving shaft.

In the modified form of the device as shown in Fig. 8 of the drawings we have provided a friction wheel 71 which is mounted on the shaft 45 and inside of the sprocket wheel which is mounted on said shaft. Rotatably mounted on the shaft 45 and between the sprocket wheel thereon and the friction wheel 71 is the bearing 72 having one end of the shaft 73 rotatably mounted therein. The other end of the shaft 73 is rotatably mounted in the bearing 74 which bearing is designed to maintain the upper end of the shaft in position relative to a gear wheel 75 which is connected with the outer face of the friction disk 41. On the upper end of the shaft 73 we have provided a worm gear 76 which is in mesh with the gear wheel 75 so that when the shaft 73 is stationary the gear wheel 75 will be held stationary and the disk will also be held stationary. Slidingly mounted on the shaft 73 is a friction roller 77 which is designed to engage the outer surface of the friction wheel 71 so that by placing the friction roller 77 in engagement with the friction disk 71 when the shaft 45 is rotated, shaft 73 will be rotated and will correspondingly rotate the friction disk 41 but when the friction roller 77 is out of engagement with the friction disk 71, the friction disk 41 will be maintained in a stationary position, owing to the arrangement of our worm gear. It is sometimes desirable to drive the friction disk in the opposite direction from which the friction wheels 33 and 34 are being rotated in order to increase the rapidity with which these wheels are rotated and thus increase their driving of the hub 14 and thus effect a corresponding increase of the driving speed of the shaft 45 and this is accomplished by throwing the friction roller 77 into engagement with the friction disk 71. Attached to the side of the frame of the band cutters and feeders to which our governors are attached we have provided a lever so arranged as to throw the frictional roller 77 out of or into engagement with the friction disk 71 and to maintain it in the desired position.

Having thus described our invention what we claim and desire to secure by Letters Patent of the United States, therefor is:—

1. A speed governor comprising a friction disk, friction wheels in engagement with the disk, designed to be moved radially outward and inward as they are driven around a given center, means for driving said wheels around said center and means for rotating the friction wheels.

2. A speed governor comprising a friction disk, friction wheels in engagement with the disk, designed to be moved radially outward and inward as they are driven around a given center, means for driving said wheels around said center and means for rotating said wheels constantly as they are driven around said center.

3. A speed governor comprising a friction disk, friction wheels in engagement with the disk, designed to be moved radially outward and inward as they are driven around a given center, means for driving said wheels around said center, means for rotating said wheels constantly as they are driven around said center, and means for controlling the radial movement of said friction wheels.

4. A speed governor comprising a friction disk, friction wheels in engagement with the disk, designed to be moved radially outward and inward as they are driven around a given center, means for driving said wheels around said center and means for controlling radial movement of the friction wheels.

5. A speed governor comprising a friction disk, friction wheels in engagement with the disk, designed to be moved radially outward and inward as they are driven around a given center, means for driving said wheels around said center and springs for maintaining the friction wheels normally at their inner limit of movement.

6. A speed governor comprising a friction disk, friction wheels in engagement with the disk, designed to be moved radially outward and inward as they are driven around a given center, means for driving said wheels around said center, springs for maintaining the friction wheels normally at their inner limit of movement and means for adjusting the tension of said springs.

7. A speed governor comprising a friction disk, friction wheels in engagement with the disk, designed to be moved radially outward and inward as they are driven around a given center, means for driving said wheels around said center and means connected with said friction wheels, designed to maintain each of them in same radial position relative to the axis around which they are driven.

8. A speed governor comprising a friction disk, friction wheels in engagement with the disk, designed to be moved radially, outward and inward as they are driven around a given center, means for driving said wheels around said center an equalizer connected with said friction wheels, designed to maintain each of them in same radial position relative to the axis around which they are driven and springs attached to said equalizer.

9. A speed governor comprising a friction disk, friction wheels in engagement with the disk, designed to be moved radially, outward and inward as they are driven around a given center, means for driving said wheels around said center, equalizer connected with said friction wheels, designed to maintain each of them in same radial position relative to the axis around which they are driven, springs attached to said equalizer and means for adjusting tension of said springs.

10. A speed governor comprising friction wheels, a friction disk in engagement with said friction wheels, means for maintaining the friction disk in engagement with the friction wheels, as the friction wheels are driven around a given center and means for driving said wheels around said center and automatic means for varying the position of the friction wheels.

11. A speed governor comprising friction wheels, a friction disk in engagement with said friction wheels, means for springingly maintaining the friction disk in engagement with the friction wheels as the friction wheels are driven around a given center, and means for driving said wheels around said center.

12. In a speed governor, a flanged disk designed to be mounted on the driving shaft of a machine to be controlled by the governor, friction wheels mounted inside of the said flanged disk, a friction disk mounted outside of said friction wheels and inside of said flange, designed to constantly engage the friction wheel and automatic means for varying the position of the friction wheels.

13. In a speed governor, a flanged disk mounted on the driving shaft of the machine to which the governor is attached, friction wheels slidingly and rotatably mounted inside of the flange of said disk and a friction disk designed to engage said friction wheels and be driven by them when the friction wheels are outside of their inner limit of movement.

14. In a speed governor, two rotatably mounted shafts, a friction wheel slidingly mounted on each of said shafts, springs mounted outside of said shafts and designed to normally hold the friction wheels at their inner limit of movement and a friction disk designed to be driven by the friction wheels when these friction wheels are away from their inner limit of movement.

15. In a speed governor, a flanged disk, two shafts rotatably mounted between the flanges of said disk, friction wheels mounted on said shafts, a friction disk in engagement with said friction wheels and designed to be driven by them as the flanged disk is rotated and automatic means for varying the position of the friction wheels.

16. In a speed governor, a flanged disk, two rotatably mounted shafts inside the flanges of said disk, a friction wheel slidingly mounted on each of said shafts, a friction disk in engagement with said friction wheels and designed to be driven by them, as the flanged disk is rotated, means for normally holding the friction wheels at their inner limit of movement on the shafts.

17. In a speed governor, two rotatably mounted friction wheels capable of movement away from each other, a friction disk in engagement with said friction wheels, means for normally holding the disk in engagement with the friction wheels, so arranged as to allow a slight tilting of the disk if one of the friction wheels is slightly larger than the other.

18. In a speed governor, a flanged disk designed to be firmly attached to the driving shaft of the machine to which it is attached, friction wheels rotatably mounted inside of the flanges of said disk, means for rotating the friction wheels as the flanged disk is rotated, a friction disk constantly in engagement with the friction wheels and controlled by them as they are rotated.

19. In a speed governor, a flanged disk designed to be firmly attached to the driving shaft of the machine to which it is attached, friction wheels rotatably and slidingly mounted between the flanges of said disk, means for rotating the friction wheels as the flange disk is rotated, and a friction disk constantly in engagement with the friction wheels and controlled by them as they are rotated.

20. In a speed governor, a flanged disk designed to be firmly attached to the driving shaft of the machine which it is to control, friction wheels rotatably and slidingly mounted between the flanges of said disk, means for rotating the friction wheels as the flanged disk is rotated, a friction disk constantly in engagement with the friction wheels and controlled by them as they are rotated, and springs for holding the friction wheels normally at their inner limit of movement.

21. In a speed governor, a flanged disk designed to be firmly attached to the driving shaft of the machine which it is to control, friction wheels rotatably mounted inside the flanges of said disk, means for rotating the friction wheels, as the flanged disk is rotated, and a friction disk constantly in engagement with the friction wheels and controlled by them as they are rotated, said disk being so mounted as to be capable of tilting slightly and thus keep the disk and friction wheels constantly in engagement with each other.

22. In a speed governor, a stationary gear wheel, rotatably mounted gear wheels, a shaft attached to each of the rotatably mounted gear wheels, a friction wheel mounted on each of said shafts, a flanged disk mounted outside of said shafts and said friction gear wheel which is detachably connected with the main driving shaft of the machine, said shafts and said flanged disk being so connected with each other that as the main shaft is rotated the rotatably mounted bevel gear wheels will travel around the stationary bevel gear and cause the shafts which are attached to the rotatably mounted beveled gear wheels to be rotated and rotate the friction wheels, and a friction disk in engagement with said friction wheels.

23. In a speed governor, the combination of a flanged disk, having an opening through its central portion designed to receive a shaft, means for securing the flanged disk to the shaft, a friction disk mounted inside of said flange, and means mounted inside of said flange for driving said disk, said means being controlled by the rotary speed of the main driving shaft.

24. In a speed governor, the combination of a flanged disk, having an opening through its central portion designed to receive a shaft, means for securing the flanged disk to the shaft, a friction disk mounted inside of said flange, and slidingly and rotatably mounted friction wheels designed to drive the friction disk when in certain position of their limit of movement, and. means for driving the friction wheels.

25. In a speed governor, the combination of a flanged disk, having an opening through its central portion designed to receive a shaft, means for securing the flanged disk to the shaft, a friction disk mounted inside of said flange, said disk having a sprocket wheel on its exterior portion, and slidingly and rotatably mounted friction wheels designed to constantly engage said disk and means for driving the friction wheels.

26. In a speed governor, the combination of a flanged disk, having an opening through its central portion designed to receive a shaft, means for securing the flanged disk to the shaft, a friction disk mounted inside of said flange, said disk having a sprocket wheel on its exterior portion, slidingly and rotatably mounted friction wheels designed to constantly engage said disk, and means for maintaining the friction disk in engagement with the friction wheels and means for driving the friction wheels.

27. In a speed governor, the combination of a flanged disk, having an opening through its central portion designed to receive a shaft, means for securing the flanged disk to the shaft, a friction disk mounted inside of said flange, said disk having a sprocket wheel on its exterior portion, slidingly and rotatably mounted friction wheels designed to constantly engage said disk and a spring for maintaining the friction disk in engagement with the friction wheels and means for driving the friction wheels.

28. In a speed governor, the combination of a flanged disk, having an opening through its central portion designed to receive a shaft, means for securing the flanged disk to the shaft, a friction disk mounted inside of said flange, said disk having a sprocket wheel on its exterior portion, slidingly and rotatably mounted friction wheels designed to constantly engage said disk, means for maintaining the friction disk in engagement with the friction wheels, a ball bearing for said friction disk upon which it is designed to rotate and means for driving the friction wheels.

29. In a speed governor, the combination of a flanged disk having an opening through its central portion designed to receive a shaft, means for securing the flanged disk to the shaft, a friction disk mounted inside of said flange, said disk having a sprocket wheel on its exterior portion, slidingly and rotatably mounted friction wheels designed to constantly engage said disk, a ball bearing for said friction disk upon which it is designed to rotate, and means for holding the friction disk in engagement with the friction wheels and means for driving the friction wheels.

30. In a speed governor, the combination of a flanged disk, having an opening through its central portion designed to receive a shaft, means for securing the flanged disk to the shaft, a friction disk mounted inside of said flange, said disk having a sprocket wheel on its exterior portion, slidingly and rotatably mounted friction wheels designed to constantly engage said disk, a ball bearing for said friction disk upon which it is designed to rotate, and a spring for holding the friction disk in engagement with the friction wheels and means for driving the friction wheels.

31. A driving shaft, a driven shaft, a governor operatively connected with the driving shaft and with the driven shaft, for automatically varying the speed of the driven shaft at a different ratio from the variations of the speed of the driving shaft as the shafts are operated.

32. A speed governor comprising a friction disk, friction wheels in engagement with the friction disk for driving it and increasing its speed as said wheels are moved radially outward, means for driving the friction wheels around a given center and means for rotating the friction wheels.

33. A speed governor, comprising a friction disk, friction wheels in engagement with the friction disk, a driving shaft, means operatively connecting the friction wheels and the driving shaft, so arranged that as the shaft is rotated, the friction wheels will be driven around the shaft and rotated, for automatically controlling the speed transmitted from the driving shaft.

34. A driving shaft, a driven shaft, a governor operatively connected with the driving shaft and with the driven shaft, for automatically varying the speed of the driven shaft at a different ratio from the variations of the speed of the driving shafts as the shafts are operated and means for operating the shafts.

35. In a speed governor, rotatably mounted friction wheels, a friction disk in engagement with said friction wheels and designed to be automatically controlled by them and means for driving the friction wheels around a given center.

36. In a speed governor, rotatably mounted friction wheels, a friction disk in engagement with said friction wheels and designed to be automatically controlled by them, means for rotating said friction wheels and means for driving the friction wheels around a given center.

37. In a speed governor, rotatably mounted friction wheels, a friction disk in engagement with said friction wheels, means for driving said wheels around a given center for automatically controlling the rotation of the friction disk.

Des Moines, Iowa, Oct. 8th, 1903.
HOWARD F. SNYDER.
JOHN T. HUME.

Witnesses:
  JOS. SEKAVEC,
  WILL HARVEY.